United States Patent Office 2,956,084
Patented Oct. 11, 1960

2,956,084
PROCESS FOR CHLORINATING HYDROCARBONS USING CHLORINE ADSORBED ON ZEOLITE

Jackson Eng and Samuel B. Baker, Sarnia, Ontario, Canada, assignors to Esso Research and Engineering Company, a corporation of Delaware No Drawing. Filed Mar. 27, 1959, Ser. No. 802,315

14 Claims. (Cl. 260—651)

This invention relates to the halogenation of organic compounds. In particular, this invention relates to a novel process for the halogenation of hydrocarbons wherein control of the ratio of halogen to feed is effected with the aid of certain zeolites. More particularly, it relates to a process wherein a halogen gas is adsorbed by crystalline alumino-silicate zeolites which are then contacted under halogenation reaction conditions with hydrocarbons.

For purposes of simplicity this invention will be described in terms of chlorinating hydrocarbons, it being understood that the technique herein described is applicable to other halogenation reactions, e.g. bromination and fluorination. Likewise this technique is not confined to the halogenation of compounds consisting only of carbon and hydrogen but may be applied to conventional halogenation reactions with organic compounds wherein the organic compound to be halogenated is directly contacted by an elemental halogen.

The reactions per se with which this invention is concerned are conventional halogenation reactions well known to the art and individually are to be conducted under the recognized conventional operating conditions of temperature, pressure, presence or absence of catalysts, etc. employed for such reactions. The inventive concept herein involved relates to the novel technique of carrying out and controlling such reactions with the aid of molecular sieves.

The chlorination of hydrocarbons is of great industrial importance. The many chlorination products of such compounds have found a wide variety of uses among which are their use as solvents, chemical intermediates, pesticides, etc. The great number of products originate by the occurrence of:

(1) Mono- and polyhalogenations (substitution of one or more than one hydrogen).
(2) Dehydrohalogenations (loss of hydrogen halide) through high heat localizations.
(3) Additions of halogens to an olefinic or acetylenic bond.
(4) Halogenolysis (splitting of C—C bonds by means of halogens).

Thus, with the acyclic alkanes, single or multiple chlorine substitution may be effected to provide such compounds as mono-, di-, tri- or tetrachloromethane and the higher homologs thereof. The reactions of the cycloalkanes depend to a large extent on the size of the ring with the lower-membered rings, e.g. cyclopropane and cyclobutane, often exhibiting reactions which result from the strained bond angles yielding acyclic chlorinated products. However, the larger cycloalkanes, e.g. cyclopentane and cyclohexane, and even the smaller rings under controlled conditions retain their ring structure in chlorine substitution reactions. Chlorine adds readily to the double bonds of both acyclic and alicyclic alkenes and alkadienes such as propylene, butadiene, cyclohexene, cyclohexadiene and the homologs thereof. At high temperatures, the addition of chlorine to olefinic hydrocarbons is accompanied by dehydrohalogenation to produce such compounds as vinyl chloride. The addition of chlorine to acetylene is accompanied by the formation of the explosive chloro-, dichloro-acetylenes, Cl—C≡CH and Cl—C≡C—Cl. To avoid the formation of such compounds particular solvents such as $SbCl_5$ have been used to produce, in the chlorination of acetylene, such compounds as 1,1,2,2 tetrachloroethane.

In the chlorination of aromatic hydrocarbons the chlorination may occur as either nuclear or side chain chlorination depending on the hydrocarbon compound involved and the conditions of reaction. Thus, benzene is chlorinated to give chlorine substitution products up to and including hexachlorobenzene. The mono-chlorinated product is utilized, among other things, for the preparation of phenol and dichlorodiphenyltrichloroethane (DDT) while p-dichlorobenzene is sold as a moth repellent. The alkyl substituted benzenes such as the methyl and ethyl benzenes provide a vast array of known chlorination products. For example, in the methyl substituted benzene derivatives such as toluene, xylene, mesitylene, durene, etc., there may be mono-, di-, or tri-chlorinations of each methyl group such as are represented by the following:

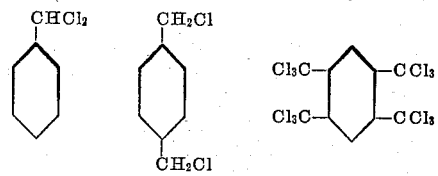

In addition, there may be both ring and side chain substitution as represented by the following formula:

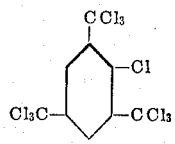

In general, nuclear chlorination is favored by low temperatures, the absence of light, the presence of chlorine carriers and the presence of certain metals such as iron, iodine or aluminum. On the other hand, chlorination in the presence of sunlight or other chemically active radiation, as well as chlorination at the boiling point of the hydrocarbon, results mainly in substitution in the side chains.

Chlorination reactions although varying somewhat as hereinbefore set forth are highly exothermic reactions and hence are quite difficult to control. Thus, if the reacting molecules are allowed to accumulate, the startof the reaction may be followed by an explosion. Hence, it is important to maintain a proper ratio of chlorine to feed with regard to product control and to prevent coking and explosions.

It is, therefore, an object of this invention to provide a means for supplying chlorine to the hydrocarbon feed reactant in amounts consistently controlled to the chlorine acceptability of the feed stock.

The prior art techniques for controlling the flow of chlorine to the reaction mixture are open to many objections. Even when the mechanical failures are not a problem the irregularity of chlorine acceptance by the chlorination feedstock tends to provide periods of both over- and under-chlorination.

It has now been found that the ratio of chlorine to feed can be efficiently controlled by first adsorbing chlorine gas in molecular sieves and contacting the chlorine-saturated sieves with the chlorination feedstock under conventional chlorination reaction conditions suitable for the preparation of the desired chlorination product.

It is now known that certain zeolites, both naturally-occurring and synthetic, quantitatively adsorb chlorine gas. The zeolites have crystal patterns such as to form structures containing a large number of small cavities interconnected by a number of still smaller holes or pores, the latter being of exceptional uniformity of size. Only molecules small enough to enter the pores can be adsorbed, though not all molecules, even though small enough to enter the pores will be adsorbed. The affinity of the molecule for the adsorbent must be present. Zeolites of this type may have pores which vary in diameter from 3 to 6 Angstrom units to 12 to 15 or more, but it is a property of these zeolites, or molecular sieves, that for a particular sieve the pores are substantially of uniform size. Accordingly, the crystal pore size determines which compound or component will be adsorbed within the crystal, i.e. those molecules which have a critical molecular diameter greater than the crystal pores diameter are not able to penetrate the crystal lattice, and accordingly, are not adsorbed, whereas those which have a critical molecular diameter smaller than the crystal pores are able to penetrate the crystal lattice and be adsorbed therein. Zeolites suitable for use with this invention may have pore diameters as small as about 4 Angstrom units and as large as about 15 Angstrom units.

The scientific and patent literature contains numerous reference to the adsorbing action of natural and synthetic zeolites. Among the natural zeolites having this sieve property may be mentioned chabazites and analcite. A synthetic zeolite with molecular sieve properties is described in U.S. 2,442,191. Zeolites vary somewhat in composition, but generally contain silicon, aluminium, oxygen and an alkali and/or alkaline earth element, e.g. sodium and/or calcuim, magnesium, etc. Analcite has the empirical formula $NaAlSi_2O_6 \cdot H_2O$. Barrer (U.S. 2,306,610) teaches that all or part of the sodium is replaceable by calcium to yield, on dehydration, a molecular sieve having the formula $(CaNa_2)Al_2Si_4O_{12} \cdot 2H_2O$. Black (U.S. 2,522,426) describes a synthetic molecular sieve having the formula $4CaO \cdot Al_2O_3 \cdot 4SiO_2$. A large number of other naturally-occurring zeolites having molecular sieve activity, i.e. the ability to selectively adsorb a straight chain hydrocarbon from a mixture containing the branched chain isomers, are described in an article, "Molecular Sieve Action of Solids," appearing in Quarterly Reviews, vol. III, pages 293–330 (1949), and published by the Chemical Society (London).

The alumino-silicate molecular sieve adsorbents suitable for use in the process of this invention are available commercially and may be produced in a number of ways. One suitable process for preparing such adsorbents involves the mixing of sodium silicate, preferably sodium metasilicate, with sodium aluminate under carefully controlled conditions. The sodium silicate employed should be one having a weight ratio of soda to silica between about 0.8 to 1 and about 2 to 1. Water glass and other sodium silicate solutions having lower soda-to-silica ratios do not produce the selective adsorbent crystals unless they are subjected to extended heat soaking or crystallization periods. Sodium aluminate solutions having a ratio of soda to alumina in the range of from about 1 to 1 to about 3 to 1 may be employed. High soda-to-alumina ratios are preferred and sodium aluminate solutions having soda-to-alumina ratios of about 1.5 to 1 have been found to be eminently satisfactory. The amounts of the sodium silicate and sodium aluminate solutions employed should be such that the ratio of silica to alumina in the final mixture ranges from about 0.8 to 1 to about 3 to 1 and preferably from about 1 to 1 to about 2 to 1.

These reactants are mixed in a manner to produce a precipitate having a uniform composition. A preferred method for combining them is to add the aluminate to the silicate at ambient temperatures using agitation to produce a homogeneous mixture. The mixture is then heated to a temperature of from about 180° to about 215° F. and held at that temperature for a period of from about 0.5 to about 3 hours or longer. The crystals may be formed at lower temperatures but in that case longer reaction periods are required. At temperatures above about 250° F. a crystalline composition having the requisite uniform size pore openings is not obtained. During the crystallization step, the pH of the solution should be maintained on the alkaline side, at about 12 or higher. At lower pH levels, crystals having the desired properties are not as readily formed.

The crystals prepared as described above have pore diameters of about 4 Angstrom units. To convert these to crystals having 5 Angstrom pores, it is necessary to employ a base exchange reaction for the replacement of some of the sodium by calcium, magnesium, cobalt, nickel, iron or a similar metal.

The base exchange reaction may be carried out by water washing the sodium alumino-silicate crystals and adding them to a solution containing the desired replacement ions. An aqueous solution of magnesium chloride of about 20% concentration, for example, may be used for preparation of the magnesium form of the 5 Angstrom sieve. After a contact time which may range from about 5 minutes to about an hour, the 5 Angstrom product is filtered from solution and washed free of the exchange liquid. About 50 to 75% of the sodium in the crystals is normally replaced during the base exchange reaction.

The crystals thus prepared are in a finely-divided state and are usually pelleted with a suitable binder material before they are calcined in order to activate them. Any of a number of binder agents used in the manufacture of catalysts may be employed for this purpose. A binder consisting of bentonite, sodium silicate and water, for example, has been found satisfactory. In using this binder, the constituents should be mixed so that the product contains from about 5 to 10% bentonite, 5 to 15% sodium silicate and about 75 to 90% of the crystals on a dry basis and that the total mixture contains about 25 to 35% water. This mixture may then be extruded into pellets or otherwise shaped and subsequently dried and calcined. Calcination temperatures of from about 700° to about 900° F. or higher are satisfactory.

It has been found that 5 Angstrom molecular sieves of the type hereinbefore described can adsorb chlorine gas in the amount of about 20 grams of chlorine to 100 grams of the 5 Angstrom sieves. By utilizing this phenomenon, a quantity of chlorine-saturated sieves can be measured to introduce the desired amount of chlorine into the hydrocarbon feed. In this way, the possibilities of over- or under-chlorination are reduced. Because of the uniformity of pore size in each type of these crystalline zeolites the chlorine adsorption capacity can be calculated for any given quantity of a given sieve. Furthermore, since the chlorine-saturated sieves can be dispersed throughout the hydrocarbon feed a more efficient distribution of chlorine in feed is obtained. The sieves also act as "heat sinks" since an appreciable portion of the heat given off in the reaction is dissipated into heating the sieves. This allows better control of the chlorination temperature and in effect minimizes temperature runaway. In this method of chlorination, the chlorine reacts with the hydrocarbon in a controlled fashion. At any instance, the chlorine adsorbed on the sieve cavity is in equilibrium with the chlorine partial pressure around the sieves. Thus, in a hydrocarbon medium, their equilibrium is disturbed by the hydrocarbon reacting with the chlorine at the entrance to the sieve cavity. This results in more chlorine coming out of the sieve cavity to re-establish the equilibrium. Of course, further chlorination occurs instantaneously and the cycle is repeated until substantially all the chlorine initially adsorbed in the sieve cavity has diffused out and reacted with the hydrocarbon. Thus, it can be seen that the chlorine is available only as fast as it is used. Hence, not only is the chlorine consumed almost entirely, but it is reacted in a controlled manner.

The process of the present invention may be subjected to many variations without departing from its scope.

Thus, under certain circumstances it may be desirable to employ crystalline sodium alumino-silicate zeolites having uniform pore openings of about 4 Angstrom units. This zeolite is the product that is obtained initially by the process described hitherto prior to the base exchange. It may also, under certain other circumstances, be desirable to employ a zeolite having somewhat larger pore openings of about 8 to 15 Angstrom units. These compositions have an empirical formula—

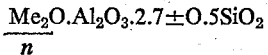

where Me is a metal and $n$ is its valence. These are prepared in a manner analogous to that of the smaller pore zeolites save that the silica-to-alumina ratio is higher. The latter are known in the art as 13×sieves.

In comparison, the conventional method of chlorination by direct injection of chlorine into the hydrocarbon feed requires special precautions. The chlorine generally must be diluted with an inert gas to prevent a too-rapid reaction. Even then, explosions in connection with reactions of this type have been commonplace. The proper chlorine injection rate is difficult to ascertain and maintain and consequently, some chlorine may pass through the hydrocarbon unreacted. As a result, chlorine utilization is not as good as in the chlorination method employing sieves.

This chlorination technique is adaptable to the chlorination of hydrocarbons in general, e.g. cyclic and acyclic alkanes, alkenes and alkadienes, acetylenes, aromatics and mixtures of the same, being modified as desired with the feed to be chlorinated and the degree or type of chlorination desired. The only limitations for the process of this invention are those imposed by the known reaction conditions of the various conventional halogenation reactions and the physical endurance of the zeolite. Hence the invention may be practiced, as far as pressure is concerned, between about 20 mm. Hg and 200 atmospheres and between temperatures of about −30° F. and 800° F.

A diluent may be used with this invention as in the conventional processes. If such diluent is used it should be either inert to the halogen or form stable compounds with the halogen that will not react with the halogenated products of the desired reaction. The halogenated hydrocarbons having a boiling point that will permit them to vaporize readily at the temperature of reaction are particularly good for this purpose. Of these carbon tetrachloride is preferred in the chlorination reactions. When a diluent is employed the diluent-to-organic reactant ratio should be in the range of about .5 to 10 to 1.

The time for carrying out these reactions by the process of this invention can vary widely depending on the organic reactant, the temperature and pressure of reaction, the presence or absence of a catalyst, and the end product desired. In general the reactions may be conducted in a time in the range of .1 to 15, preferably .1 to 2 hours. The invention may be more easily understood by resort to the following examples which are to be construed as illustrative only and the wide application of the invention should not be considered to be limited by the specific details disclosed therein.

EXAMPLE I

A 5 Angstrom alumino-silicate crystalline molecular sieve is prepared by mixing an aqueous solution of sodium metasilicate having a soda-to-silica ratio of about 1.3 to 1 with an aqueous solution of sodium aluminate having a soda-to-alumina ratio of about 1.5 to 1 in such proportions that the ratio of silica to alumina in the combined solutions is about 1.5 to 1.

In mixing the aforesaid solutions the sodium aluminate solution is added to the sodium silicate solution at ambient temperatures using conventional agitation or mixing means to rapidly effect a homogenous mixture.

The mixture is then heated at an average temperature of 195° F. for a period of about 2 hours, and a crystalline composition having the requisite uniform size (about 4 Angstroms in diameter) pore openings obtained. During the crystallization the pH of the solution is about 12.

The crystals described are next water washed and placed in a 20 wt. percent solution of calcium chloride. After about 30 minutes the solution is filtered and a crystalline composition having pores averaging 5 Angstrom units in diameter are recovered.

The 5 Angstrom crystals are pelleted using as a binder bentonite, sodium silicate and water. The crystals and binder are so mixed that the final product contains 8% bentonite, 10% sodium silicate, and 82% of the crystals on a dry basis and the total mixture contains about 25 to 35% water. This mixture is then shaped as desired, e.g. as pellets, dried and calcined at about 900° F.

EXAMPLE II

Pure chlorine gas was passed through 800 grams fresh 5 Angstrom molecular sieves which were pre-dried at 850° F. with nitrogen purging. The operating conditions were 750 F., atmospheric pressure and 195 ml. of chlorine per minute. ($\approx$ 16 v./v./hr.) At these conditions, chlorine was quantitatively and selectively adsorbed. On sieve saturation, the amount of chlorine sorbed on the sieves was about 150 grams total or approximately 19 grams per 100 grams of fresh sieves. During the sorption, the nitrogen displaced by the chlorine did not show any trace of chlorine (by potassium iodide-starch indicator) and the chlorine breakthrough was very sharp upon sieve saturation. Temperature peaks amounting to over 65° F. rise due to heat of adsorption were clearly evident during the run.

Once the sieves had been saturated, the chlorine was easily recovered by heating the sieves to about 300° F. A small nitrogen purge was used at the end of the desorption step to purge out traces of chlorine remaining in the reactor. Pure chlorine was recovered totalling essentially 100% of the initial amount sorbed on the sieves.

The sorption was repeated on the reactivated sieves with a chlorine-air mixture. Excellent selectivity in sorbing the chlorine was obtained. The composition of the gas mixture was varied from 50 to 75% chlorine and the chlorine space velocity increased from 16 to 49 v./v./hr. with no decrease in sieve selectivity. The amount of chlorine sorbed into the sieves in the second cycle was 156 grams total which was equivalent to the first cycle sorption with fresh sieves. Thus, there was no loss in sieve capacity.

The data on these two cycles are shown in Table I.

Table I
SORPTION OF CHLORINE GAS ON A 5 ANGSTROM MOLECULAR SIEVE

| | Cycle 1 | | Cycle 2 | | |
|---|---|---|---|---|---|
| | Sorption | Desorption | Sorption | | |
| Feed | 100% chlorine | | {50% chlorine, 50% air} | 67%, 33% | 75%, 25%. |
| Conditions: | | | | | |
| Temp., °F | 75 | 75–700 [1] | 75 | 75 | 75. |
| Pressure, mm. Hg | 750 | 750 | 750 | 750 | 750. |
| Chlorine Rate— | | | | | |
| ml./min | 195 | | 195 | 400 | 600. |
| v./v./hr | 16 | | 16 | 33 | 49. |
| Raffinate or Desorbate | Pure Nitrogen | Pure Chlorine | Pure Air | Pure Air | Pure Air. |
| Total Chlorine Sorbed: | | | | | |
| Grams | 150 | | | 156 | |
| g/100 g. sieves | 19 | | | 19.5 | |
| Total Chlorine Desorbed: | | | | | |
| Grams | | 160 | | | |
| Percent of sorbed chlorine | | 100 | | | |

[1] Essentially all chlorine was recovered when sieves heated to 300° F.

EXAMPLE III 100 grams of 5 Angstrom alumino-silicate crystalline molecular sieves upon which 20 grams of chlorine had been adsorbed and 15 grams of p-xylene were placed in a round-bottom glass flask fitted with a reflux condenser. Carbon tetrachloride in an amount sufficient to just cover the sieves was addded to the flask. The reaction occurred spontaneously and the mixture was then heated to a temperature of about 180° F. and refluxed for 10 minutes. When hydrogen chloride was no longer evolved the heat source was removed and the spent sieves were separated from the hydrocarbon and solvent by filtration. The chlorinated products, p-xylylene dichloride (6 grams), a lesser amount of p-xylyl chloride (2 grams) and p-xylylidene chloride (1.5 grams) were recovered from the carbon tetrachloride and unreacted p-xylene by simple distillation. The spent sieves were heated to 500° F. to determine the amount of unreacted chlorine. Less than 0.5 gram of chlorine were evolved from the 100 grams of sieves indicating over 97% of the initially adsorbed chlorine had been released for chlorination.

EXAMPLE IV

Pure chlorine gas is passed through 4 Angstrom molecular sieves at 80° F. and at atmospheric pressure. Chlorine is quantitatively adsorbed on such sieves.

EXAMPLE V

A chlorine and air mixture is passed through 13 Angstrom molecular sieves at 75° F. and at atmospheric pressure. Chlorine gas is selectively adsorbed on such sieves.

EXAMPLE VI

5 Angstrom sieves (100 grams) saturated with chlorine (19 grams) were just covered with carbon tetrachloride and n-hexadecane (60 grams) in a round-bottom glass flask in the presence of a source of actinic light. The flask was fitted with a thermometer and reflux condenser.

The mixture heated spontaneously to 43° C., the ambient temperature being 29° C. After about 30 minutes the mixture began to cool spontaneously and external heat was applied to cause refluxing for 30 minutes.

The mixture was filtered, the spent sieves washed with a small volume of carbon tetrachloride and the combined filtrates were concentrated by distillation. The recovered sieves contained less than 0.5% chlorine. The oily liquid after complete removal of carbon tetrachloride was distilled at 144–147° C./2 mm. Analysis indicated 1.1 atoms chlorine per molecular weight.

EXAMPLE VII

13 Angstrom molecular sieves are saturated with 1 mole of chlorine and placed in a glass reactor fitted with a reflux condenser. One half mole of ethylene and enough carbon tetrachloride to cover the sieves are added to the reactor. A reaction procedure such as that set forth in Example VI is carried out and an addition product of chlorine and ethylene is obtained.

EXAMPLE VIII

A chlorination reaction is carried out as in Example VII except that the hydrocarbon feedstock is cylopentane and ultra violet light from a mercury vapor lamp is used to catalyze the reaction.

All percentages herein set forth and not otherwise designated or defined shall be construed as percentage by weight.

The terms "sorb," "sorbed" and "sorption" are used herein to include adsorption and/or absorption.

What is claimed is:

1. An improved process for chlorinating hydrocarbon compounds which comprises sorbing chlorine on a crystalline metallic alumino-silicate zeolite having uniform pore openings in the range of about 4 to about 15 Angstrom units and contacting said zeolite with a hydrocarbon compound under chlorination reaction conditions.

2. A process in accordance with claim 1 wherein said hydrocarbon is a saturated aliphatic hydrocarbon.

3. A process in accordance with claim 1 wherein said hydrocarbon is an unsaturated aliphatic hydrocarbon.

4. A process in accordance with claim 1 wherein said hydrocarbon is an aromatic hydrocarbon.

5. An improved process for chlorinating hydrocarbon compounds which comprises sorbing chlorine gas with a crystalline metallic alumino-silicate zeolite having uniform pore openings from 4 to 15 Angstrom units in diameter, contacting said zeolite in a reaction zone with a hydrocarbon compound at a temperature in the range of −30° F. to 800° F. and a pressure in the range of 20 mm. Hg to 200 atmospheres.

6. A process in accordance with claim 5 wherein said pressure is about one atmosphere.

7. A process in accordance with claim 5 wherein said pore openings are about 5 Angstroms in diameter.

8. An improved process for producing chlorinated hydrocarbons which comprises saturating a crystalline metallic alumino-silicate zeolite having uniform pore openings from 4 to 15 Angstrom units in diameter with chlorine, contacting said zeolite in an enclosed reaction vessel with a hydrocarbon and a chlorinated hydrocarbon diluent at a temperature in the range of −30° F. to 800° F. and a pressure in the range of 20 mm. Hg and 200 atmospheres in the presence of actinic light.

9. A process in accordance with claim 8 wherein said temperature is in the range of −30° F. to 275° F.

10. A process in accordance with claim 8 wherein said chlorinated hydrocarbon diluent is carbon tetrachloride.

11. An improved process for producing chlorinated hydrocarbons in a reaction in which hydrocarbons are in direct contact with chlorine gas which comprises sorbing chlorine gas on a crystalline metallic alumino-silicate zeolite having uniform pore openings from 4 to 15 Angstrom units, contacting the resulting chlorine-containing zeolites in a reaction vessel having a reaction zone and equipped with a reflux condenser with a hydrocarbon and a diluent inert to the resulting chlorination reaction to form a reaction mixture, heating said mixture to a temperature sufficient to maintain a portion of said reaction mixture in the vapor state, maintaining said condenser at a temperature high enough to permit the escape of HCl formed in said reaction from said reaction mixture and low enough to condense vapors of the remainder of said reaction mixture, refluxing the reaction mixture for a period of time in the range of .1 to 2 hours and recovering the resulting chlorinated hydrocarbons from said reaction mixture.

12. In a process for chlorinating hydrocarbon compounds in a reaction vessel having a reaction zone, the improvement which comprises controlling the ratio of chlorine to hydrocarbons in said reaction zone by sorbing a measured amount of chlorine gas on a crystalline metallic alumino-silicate zeolite having uniform pore openings from 4 to 15 Angstrom units, contacting such chlorine-containing zeolite in said reaction zone with a predetermined amount of the hydrocarbon to be chlorinated at a temperature in the range of −30° F. to 275° F. and a pressure in the range of 20 mm. Hg and 200 atmospheres.

13. A process in accordance with claim 11 wherein the reaction is carried out in the presence of a catalyst.

14. In a process for producing chlorinated hydrocarbons which comprises reacting a hydrocarbon with chlorine gas in a reaction vessel having a reaction zone and equipped with a reflux condenser, the improvement which comprises controlling the chlorine-to-hydrocarbon ratio in said reaction zone by saturating a measured amount of a crystalline metallic alumino-silicate zeolite having uniform pore openings from 4 to 15 Angstrom units in diameter with chlorine gas, contacting said chlorine saturated zeolites with a measured amount of a hydrocarbon and a diluent inert to the resulting chlorination reaction at a temperature in the range of −30° F. to 275° F. and a pressure in the range of 20 mm. Hg to 200 atmospheres to form a reaction mixture, maintaining a temperature in said reaction zone sufficient to effect a reflux of a portion of said reaction mixture for a period of time in the range of about .1 to about 2 hours, and separating the resulting chlorinated hydrocarbons from said reaction mixture.

References Cited in the file of this patent

Barrer: J. Soc. Chem. Ind. 64, 130–1 (May 1945).

Migrdichian: "Organic Synthesis," vols. I and II, Reinhold Publishing Corp. (1957), pages 4–6, 855–6 and 1534–6 relied on.